(12) United States Patent
Repp et al.

(10) Patent No.: US 6,758,440 B1
(45) Date of Patent: Jul. 6, 2004

(54) ELECTROMAGNETIC AIRCRAFT ARRESTOR SYSTEM

(75) Inventors: Jeffrey R. Repp, Export, PA (US); David William Scherbarth, Pittsburgh, PA (US); David Jonathan Hall, Pittsburgh, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 0 days.

(21) Appl. No.: 10/394,803

(22) Filed: Mar. 21, 2003

(51) Int. Cl.[7] .................................................. B64F 1/02
(52) U.S. Cl. ............................... 244/110 R; 244/110 C
(58) Field of Search .......................... 244/110 A, 110 C, 244/110 F, 110 H, 110 R, 110 G

(56) References Cited

U.S. PATENT DOCUMENTS 3,172,625 A * 3/1965 Doolittle ................. 244/110 R
3,589,650 A * 6/1971 Carlsson et al. ......... 244/110 A
3,604,665 A * 9/1971 Truman ................... 244/110 A
3,620,489 A * 11/1971 Riblett, Jr. .............. 244/110 C

* cited by examiner

*Primary Examiner*—Robert P. Swiatek
(74) *Attorney, Agent, or Firm*—Reed Smith LLP

(57) ABSTRACT

A system and method for electromagnetically arresting an aircraft landing on an undersized runway, as on an aircraft carrier. The system preferably comprises a cross-deck pendant cable coupled to two purchase cables that are wound around low inertia purchase cable spools on opposite ends. The shafts of the purchase cable spools are mechanically coupled to one or more low inertia induction machines used to arrest the landing aircraft. As the aircraft contacts the cross-deck pendant cable and extends the purchase cables down the runway, power electronics in the system apply a torque based on closed-loop feedback to the induction machine acting as a generator, and the mechanical energy of the aircraft is converted to electrical energy at the generator and is dissipated as heat in an attached resistor. The one or more induction machines are preferably cup-type generators, and the generators may be briefly run as motors to initially reduce the tension on the purchase cables.

19 Claims, 6 Drawing Sheets

ELECTROMAGNETIC AIRCRAFT ARRESTOR SYSTEM

BACKGROUND OF THE INVENTION

1. Field of the Invention

The present invention relates generally to an electromagnetic-based arresting system for use onboard an aircraft carrier to catch and stop an incoming aircraft, and, more particularly, the present invention utilizes a low inertia induction motor/generator which allows the rapid acceleration of the spool, generator and arresting cable to match the landing speed of the aircraft before applying braking torque to ultimately stop the aircraft.

2. Description of the Background

For various remote and local applications, it is desired to land aircraft on a runway that is too short for a conventional landing, such as on an aircraft carrier or other naval vessel. Traditionally, in order to catch and stop (collectively "arrest") aircraft on a moving ship or other short runway, a cross-deck pendant cable is placed horizontally across the landing path of the incoming aircraft. A hook or other "catching" implement hanging below the belly of the aircraft engages the horizontal cable, and the resistance of the cable is then increased as the cable is run-out down the runway until the forward movement of the aircraft is halted. Because the aircraft is typically moving at a high rate of speed, there is a high level of stress on both the aircraft and the arrestor system cable upon impact. Therefore, the cable must be allowed to run-out to approach the speed of the landing plane or utilize some other tension reduction technique in order to reduce this stress on both the aircraft and the arrestor system.

Conventional aircraft arrestor systems, such as the Mark 7 (MK7) arresting gear presently used on the CVN 68 class of aircraft carriers, utilize a hydraulic ram/fluid system to partially compensate for the speed of the landing aircraft. Specifically, the cross-deck pendant cable is connected to two purchase cables that are ultimately wound around two wire spools with enough cable to run-out the length of the landing surface. Each length of purchase cable is run through a series of sheaves and sheave dampers in order to progressively impart a resistance on the purchase cable as it is run-out down the runway. Basically, as the landing aircraft imparts tension on the purchase cables, a ram is pulled through a viscous fluid to impart this progressive resistance to both absorb the initial shock of the aircraft and to eventually stop the aircraft's forward momentum. As the incoming aircraft "hooks" the cross-deck pendant and runs out the purchase cables, the sheaves and sheave dampers work to slow the aircraft.

This particular prior art system is manpower intensive for both day-to-day operation as well as in terms of maintenance. Specifically, a typical arresting gear system (there are four sets of cables on an average aircraft carrier) requires approximately 18 operators per ship. Further, key components of the system have limited service life, requiring frequent replacement, because of the large stresses imparted on the system during each landing. The amount of required maintenance is intensified because of the open-loop feedback structure of the MK7. In essence, after pre-setting certain valves based on the type and speed of the landing aircraft, there is no additional feedback or adjustment made to the purchase cable tension. Especially in off-center arrests (i.e., the plane does not impact the cross-deck pendant in the center thereby causing an unequal load distribution on each purchase cable), the actual amount of tension imparted on each purchase cable is not accurately controlled.

Moreover, the hydraulic fluid itself used in the sheave-damper system is not preferred. Specifically, this fluid is often classified as a hazardous fluid. Such fluids may leak, especially through wear, and could cause a loss of operation time for maintenance or even injury.

A second, and much more complicated prior system utilizes a mechanical means to couple the purchase cable spool to a motor/generator that is already spinning. By coupling the cable to the spinning motor/generator, the tension on the cable may be increased, and the aircraft will eventually be brought to a stop. Because of the highly complicated forces at work when coupling a running motor/generator to a running cable system, this system is expensive, less reliable, and frequently prone to error or mechanical failure.

Neither of the existing prior art systems provides a reliable aircraft arrestor system with the ability to be operated with a minimal number of personnel. Further, each of these systems are limited in the size and speed of landing aircraft that can be arrested. The present invention preferably provides better reliability through redundant control systems, reduced manning (e.g., 4–9 operators/ship) through automation, and reduced maintenance. As such, the present invention, in at least one preferred embodiment, addresses one or more of the above-described and other limitations to prior art systems.

SUMMARY OF THE INVENTION

In accordance with at least one preferred embodiment, the present invention provides an electromagnetic aircraft arrestor system utilizing a low inertia, low torque induction machine (i.e., motor/generator) to apply a progressive and controlled tension to the purchase cables during cable run-out. The basic elements of the present arrestor system may be designed to interface directly with existing sheave-damper systems currently employed with prior art hydraulic arrestor systems. One of two purchase cables are connected to each end of a cross-deck pendant which is engaged by a landing aircraft. The opposite ends of these purchase cables are preferably wound on spools coupled to the shaft of a low inertia induction machine which provides braking torque to the spool that is translated into braking tension in the cables.

As the landing aircraft moves down the runway, its mechanical energy is translated through the running purchase cables to impart rotational energy on the one or more induction machines (now running as generators) connected to the purchase cable spools. The generated electrical energy is then dissipated through the use of a braking resistor. By monitoring the rotational movement of the induction machines during cable run-out in a closed-loop feedback orientation, the proper amount of torque can be applied to the induction machine to properly slow the landing aircraft without imparting a tension in the purchase cable that exceeds the mechanical limits of the cable.

The present arrestor system may utilize a single or dual induction machine orientation to stop a landing aircraft. In a single induction machine system, both purchase cable spools are connected to the shaft of the induction machine. In the preferred system utilizing two separate induction machines, each purchase cable spool is connected to a separate machine. With this orientation, off-center aircraft arrests may be more properly controlled, as unequal torque profiles may be used on the two induction machines to account for the difference in the stresses imparted on the two purchase cables by the aircraft landing off-center.

The induction machines of the present invention may be passive and allow for the run-out of the spooled purchase cables through low torque and low inertia. However, to aid in the initial purchase cable run-out, the one or more induction machines may also optionally be capable of operating as a motor for brief periods of times. Therefore, upon initial contact between the landing aircraft and the cross-deck pendant, the induction machine(s) may unwind a specified amount of spooled cable to reduce the initial tension in the purchase cables. After a short period of time, the induction machine will return to generator mode and, through the conversion of mechanical energy to heat in a resistor, will stop the landing aircraft according to a pre-defined profile and closed-loop feedback.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Figure 1:
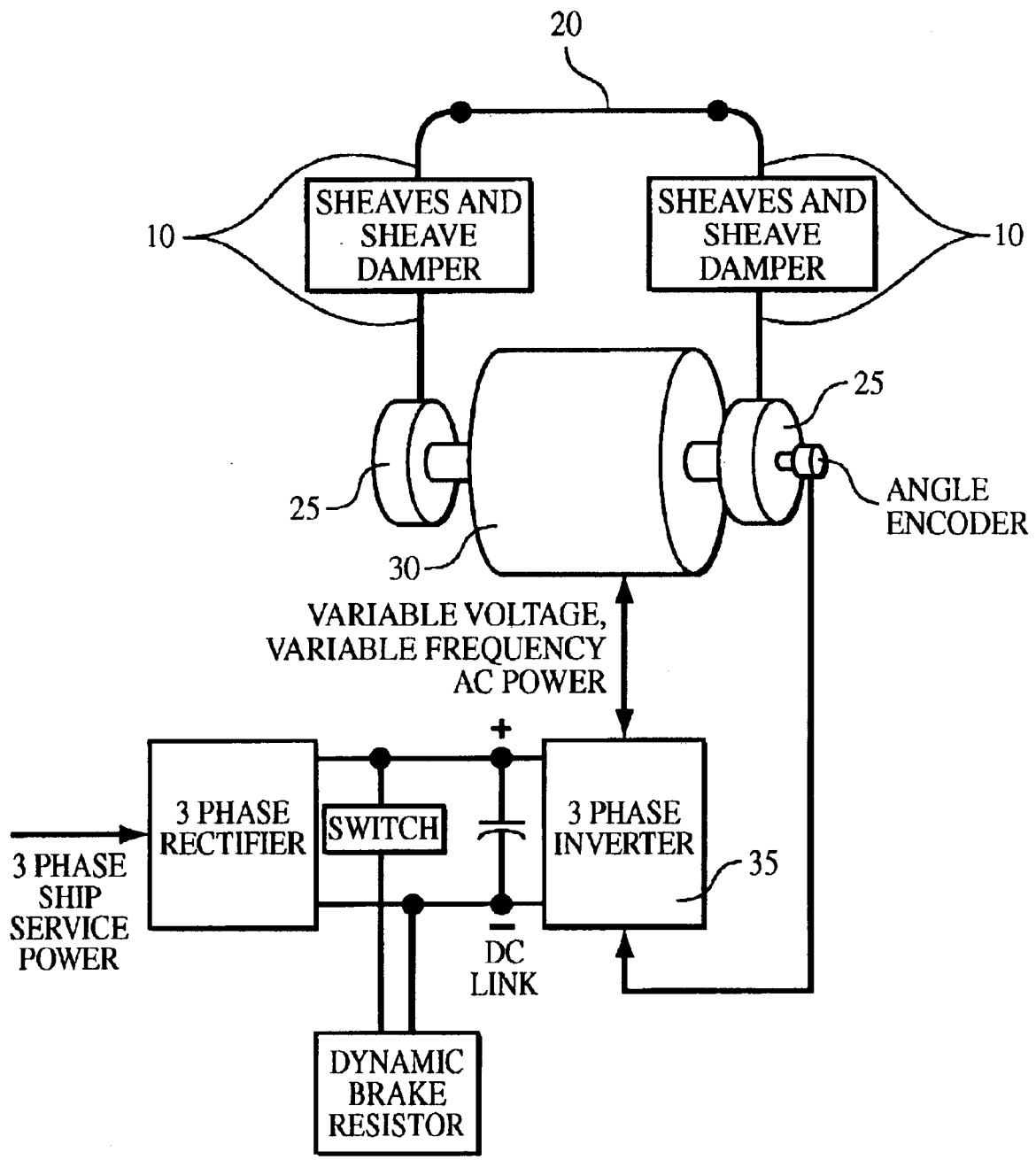
FIG. 1 depicts an exemplary embodiment of the present invention utilizing a single arrestor induction machine.

FIG. 1 illustrates the basic elements of the present arrestor system which is designed to interface directly with existing sheave damper systems currently employed with prior art hydraulic arrestor systems. Two purchase cables 10, connected to each end of a cross-deck pendant cable 20, are wound on spools 25 coupled to the shaft of a low inertia induction machine 30 (hereinafter "generator" and/or "motor", depending on present operation). The generator 30 provides braking torque to the purchase cable spools 25 that is translated into braking tension in the cables 10, 20. As the landing aircraft engages the cross-deck pendant 20, the purchase cables 10 unwind from the spools 25 and accelerate the braking generator rotor and other coupled mechanical masses. The induction generator 30 is generally energized and controlled with a variable voltage, variable frequency, 3 phase inverter 35 that tightly regulates and maintains cable tension according to a predetermined torque profile based on the type and speed of the landing aircraft. In present applications, a maximum cable tension of approximately 105,000 lbs. (467,063 Newtons) can be assumed.

Figure 2:
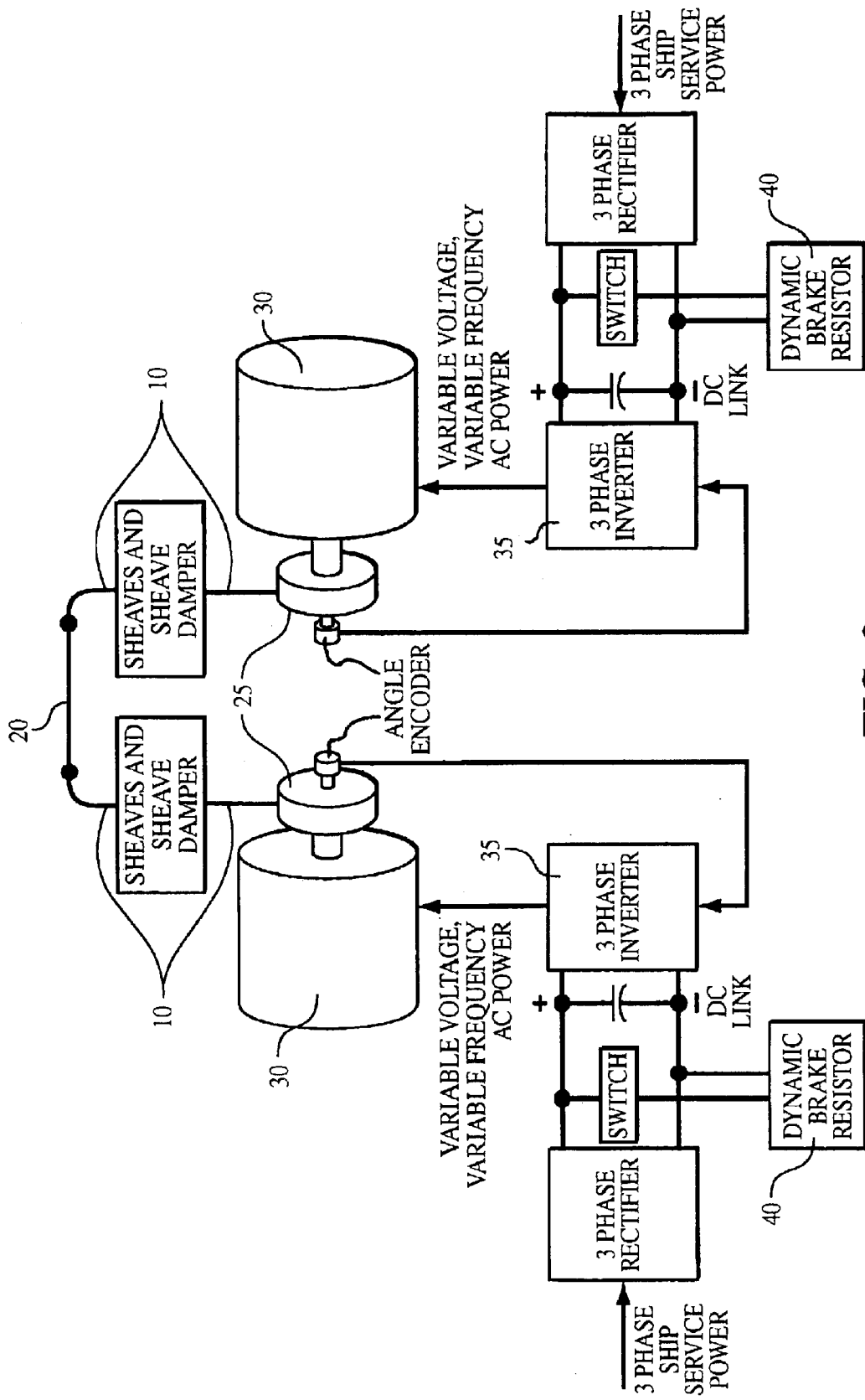
FIG. 2 depicts a preferred embodiment of the present invention utilizing two arrestor induction machines.

The baseline concept illustrated in FIG. 1 comprises a single advanced arresting induction machine 30 attached directly to each purchase cable 10 through individual cable spools 25. Although this concept will perform adequately for on-center arrests, off-center arrests may result in unwanted cable and aircraft dynamics as each cable will be strained by different forces. Therefore, to accommodate differing pay-out speeds for the two purchase cables 10 and to minimize aircraft side forces during off-center arrests, the present invention preferably includes two separate induction machines and purchase cable systems as shown in FIG. 2. Separately controlled purchase cable spools 25 may substantially eliminate these side forces which result from a single purchase cable spool by sensing and accounting for the difference in forces. This dual induction machine option is implemented by providing a separate smaller inverter and generator with each purchase cable spool (FIG. 2) and is described in more detail below.

At the initial aircraft engagement of the arrestor system, the cross-deck pendant 20, purchase cables 10, arresting induction machine 30 and other components must be accelerated to allow a cable velocity that roughly matches the speed of the arresting aircraft. As such, the induction machine 30 must have very low inertia—such that it can be quickly accelerated by the extending purchase cables. If the components do not quickly accelerate based on the aircraft's pull on the cabling 10, 20, the weaker links of the system, e.g., the purchase cables, may fail from the stress imparted thereon.

As briefly described above, the use of the cable in combination with the existing sheave-damper system reduces the initial shock loading on the cable system and aircraft while the components in the system are accelerated to a velocity in equilibrium with the aircraft. However, the ability of the cable and damper system to accommodate the initial velocity mismatch is largely a function of the inertia of the connected arresting system components, such as the induction machines, which are converted to the run-out spools. Therefore, a low inertia arresting system is more easily accommodated since the transient forces required to accelerate component masses to "aircraft velocity" are reduced.

The present invention may be used with either a passively accelerated or actively accelerated cable run-out system. If the existing or an improved sheave-damper system can limit cable stresses to acceptable levels while the machine rotor and spools are accelerated, then the induction machine 30 can be passively accelerated (i.e., accelerated only by the force of the landing aircraft on the purchase cables 10). If this is not the case, then the inverter 35 will be used to provide an accelerating torque in the induction machine 30, thereby momentarily running the machine 30 as a motor, in order to reduce the demands on the sheave-dampers and cables 10, 20. Power from the ship electrical system, conditioned by the inverter 35, will provide the required accelerating power during this brief motoring period. For example, the upper bound for this accelerating power may be approximately 3.0 MW for a short time transient, which should be well within the capabilities of existing ship electrical systems. The duration of this accelerating power is preferably less than 0.1 seconds, and the energy required is only approximately 190 kJ (kW-sec), which should have no impact on electrical system stability or rating.

After the initial motoring ("assist torque") period, if any, as the purchase cables 10 are extended, the inverter 35 creates terminal conditions that cause the induction machine 30 to act as a generator to convert the kinetic energy of the aircraft to electrical energy, which is dissipated in a controlled dynamic brake resistor 40. During the braking period, the inverter 35 closely controls the generator 30 current and torque, and brings the aircraft to a safe, controlled stop without exceeding the allowable arresting force. The dynamic brake resister 40 dissipates the converted kinetic energy of the aircraft by maintaining a predetermined voltage at the DC link of the inverter 35 using simple switch control (see, FIGS. 1 and 2).

Following the aircraft arrestment, the induction machine 30 is operated as a motor (in the reverse direction), fed from the ship power grid, to retract and rewind the cables 10 onto the purchase cable spools 25 in order to prepare for the next aircraft landing cycle.

The rotating portion of the advanced arrestor preferably comprises a generator rotor coupled to two purchase cable spools 25, as shown in FIG. 2. The unit preferably occupies the space currently occupied by prior art arresting engines. The shaft axis is oriented in the athwart ship direction, and each cable spool 30 preferably stores approximately one half of the total cable length that is pulled out onto the deck during the cable runout. In current aircraft carrier design, this amount of cable runout is approximately 381 feet, which corresponds to the design case base line runout of 365 feet, an initial cross-deck pendant length of 120 feet, and an extra 10 feet for a safety margin.

A comparison will now be made of the present preferred embodiment of the invention and a common prior art aircraft arrestor system. Both the prior art system and the present system transform the kinetic energy of the aircraft into thermal energy that is dissipated to the environment. In the prior art arrestor, heat is generated as a ram is pulled through a viscous hydraulic fluid. In the present arrestor, the kinetic energy of the aircraft is transformed into electrical energy that is dissipated as heat in a resistor. In both arrestor systems, some type of mechanical apparatus must move to transform the kinetic energy into thermal energy. In the prior art system, the moving apparatus is the ram and the set of sheaves attach to it. According to the present invention, the moving element is the generator rotor and the attached cable spools. A prior art hydraulic-based system, such as the Mark 7, can effectively transfer energy to the hydraulic fluid at low ram velocities. Multiple sheaves are used to reduce the ram velocity to a small fraction of the linear cable velocity on the deck of the ship. However, this feature limits the kinetic energy transferred to the ram, and also limits the effective inertia of the system as a whole.

The present electromagnetic arrestor, unlike the prior art hydraulic systems, requires a relatively high rotor surface velocity in the generator to achieve the necessary energy transfer rates (power) with reasonably sized equipment. In other words, the velocity of the mechanical apparatus, or more specifically the angular velocity of the generator rotor at the periphery, must be fairly high while keeping the kinetic energy and inertia of the system to acceptably low levels. The tension in the cables during an arrest causes the generator to rotate as the cable is unwound from the spool. Achieving a suitably low rotational inertia is important to limit the cable tension during the initial arrestor transient.

Following this initial transient period, cable tension, and therefore aircraft braking, results from the controlled application of torque to the generator rotor. The deck level sheave-dampers, preferably utilized from existing systems, are designed to reduce these initial "hook-up" forces by providing compliance in the cable system. As the system inertia increases in a passively accelerated system, the sheave-dampers must be designed to provide additional compliance to limit cable tension during the initial system "acceleration" period.

As an optional embodiment, the present system has the potential to reduce, and possibly eliminate, reliance on the deck level sheave-dampers through the application of accelerating torque to the generator rotor immediately following pendant engagement. In the early stages of runout, the present arrestor system and the aircraft can be made to work together to accelerate the generator rotor and cable spools from rest. The amount of rotor acceleration that can be produced by the aircraft is limited by the design of the cable tension (e.g., 105,000 lbs.). If additional accelerating torque is required, it may be provided by the present system using the induction machine as a motor. As briefly described above, the duration of the motoring mode is approximately 0.1 seconds, beginning at the start of cable runout. The power requirements of this motoring mode may be decreased by limiting the inertia of the machine and spools. The addition of a gear box to the system to increase generator speed is possible, but not preferred due to the negative impacts of gear box size and weight, and increased motoring power resulting from increased effective rotor inertia.

As the spool diameter is increased, the shaft speed is decreased, which results in a longer heavier generator. This undesirable trend is offset by reductions in motoring power in total length due to the reduction in rotational kinetic energy that results from the lower rotational speed and shortened cable spool. The spool length decrease is generally larger then the generator length increase.

Figure 3:
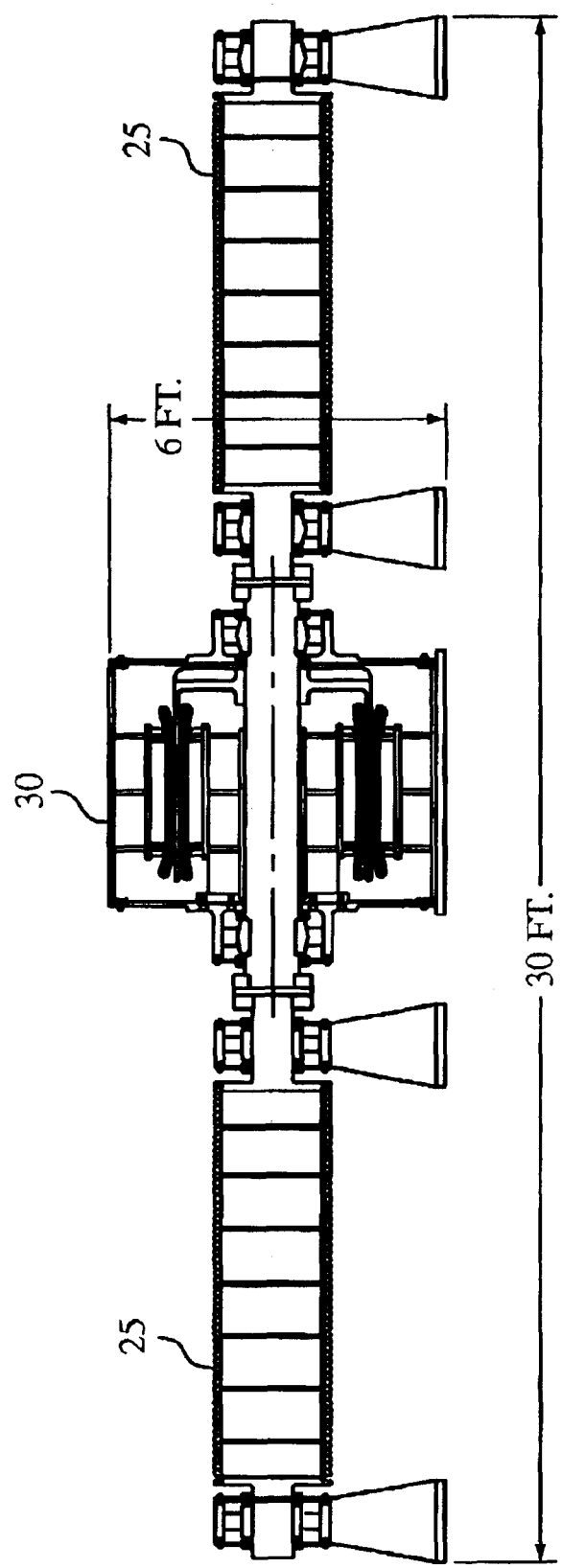
FIG. 3 shows a rear view of an arrestor system with a single arresting induction machine.
Figure 4:
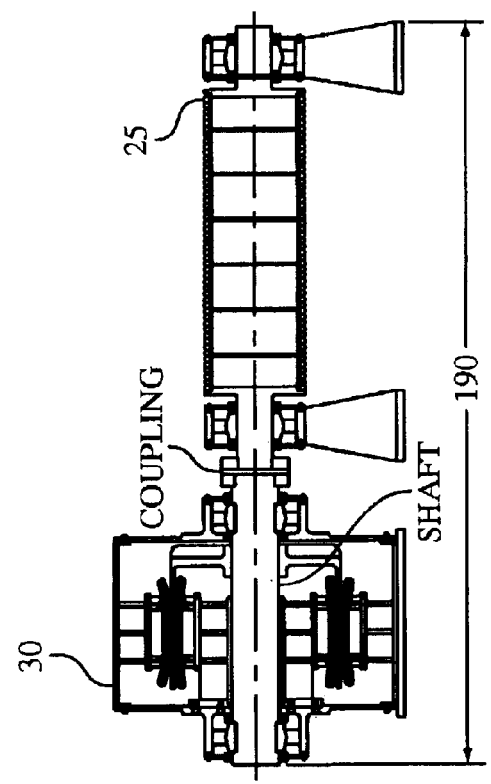
FIG. 4 shows a rear view of an arrestor system with dual arresting induction machines.
Figure 4:
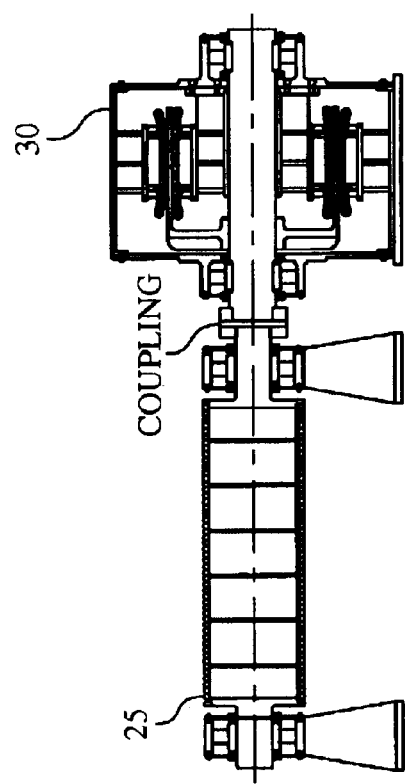
Figure 5A:
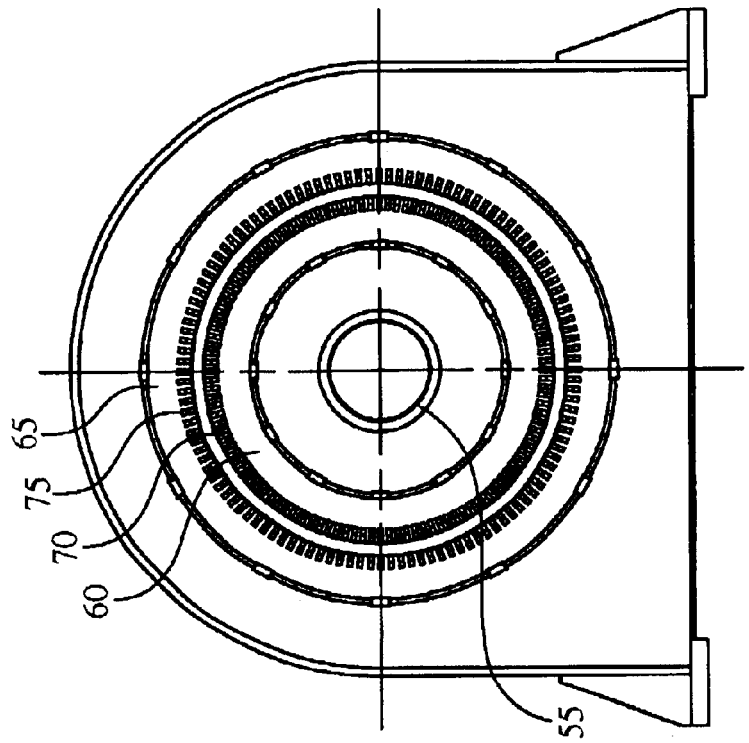
FIG. 5 shows an induction machine for a dual induction machine arrestor system.
Figure 5:
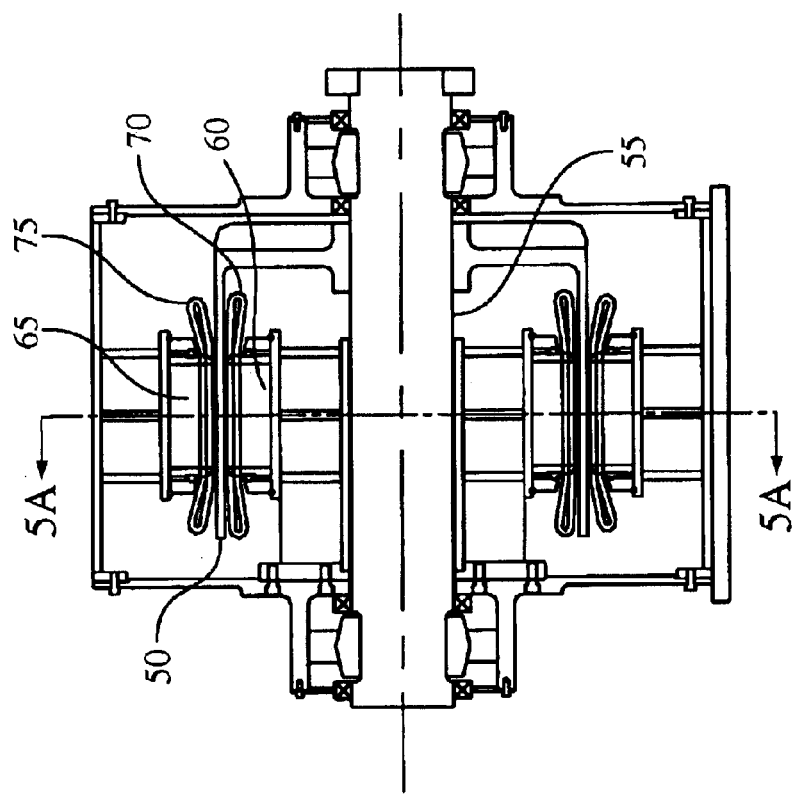

FIGS. 3 and 4 show rear views of two embodiments of the present invention. As shown in FIG. 3, the purchase cables may be wound on two cable spools 25 coupled directly to each end of a single generator 30 shaft. FIG. 4 shows an alternative orientation of the system including two generator end cable spools 25 working together. Because the utilization of two separate induction machines 30 provides a greater degree of control which is necessary for off-center arrests, the dual induction machine embodiment (FIG. 4) is preferred. The dimensions shown in FIGS. 4–5 are exemplary and not limiting.

The induction generator, in conjunction with an inverter, provides a controlled retarding force to the aircraft through the purchase cables. The inverter preferably uses a field-oriented control scheme to closely follow a preprogrammed force profile (described below). In order to provide the necessary low inertia generator, equipment selection is important. As such, a low-inertia, cup-type induction generator with a double sided stator winding is the preferred induction machine because of its ability to provide high braking torque with low inertia (see, FIG. 5).

Various different configurations may be used for the generator secondary including induction, reluctance, permanent magnet, and wound field synchronous. A wound field synchronous topology is not preferred due to the complexity of fabricating a low inertia, wound field rotor, and the need to provide field excitation with brushes. The reluctance configuration is not preferred due to its poor power density, high rotor inertia, and low operating power factor. The permanent magnet synchronous generator topology offers the advantages of low excitation requirements (high power factor) and high power density, but may require high risk composite rotor construction to achieve the necessary low inertia.

Therefore, the double-sided armature, cup-type rotor induction generator provides the best compromise of low weight, low inertia, high power density, and minimal technical development. FIG. 5 shows one exemplary embodiment of two section views (FIGS. 5 and 5A) of a cup-type induction generator for a dual arrestor system according to the present invention. The section view along the rotor axis shows the overall geometry of the induction generator. A low inertia aluminum cup rotor 50 is attached to the shaft 55 of the machine and extends axially between two concentric stator cores (inner stator core 60 and outer stator core 65). The aluminum rotor 50 is preferably constructed from solid, high strength aluminum material and forms a hollow cylinder. In an exemplary embodiment, this cylinder may have a mean diameter of approximately 42.0" and a thickness of approximately 1". The concentric stators employ a three phase, eight pole winding.

The stator coils are preferably multi-turn, form-wound coils distributed within a two layer lap winding (inner stator windings 70 and outer stator windings 75). In a preferred embodiment, the maximum rotational velocity of the generator rotor and cable spools (with the maximum aircraft velocity arrest) is approximately 1,903 RPM. This corresponds to a maximum electrical frequency of approximately 127 Hertz. The stator electrical cores are preferably constructed of thin silicon steel laminations, dimensionally sized to provide adequate electrical performance while minimizing the weight of the active components. The axial length of the stator core is approximately 24.1 inches, which translates to a maximum shear stress of 20 psi. The generator is preferably designed for a maximum phase-to-neutral voltage of 1,630 $V_{rms}$. Table 1 summarizes the mechanical and electrical characteristics for an exemplary preferred cup-type induction generator for use with the present invention.

TABLE 1

| Outer Stator, | Outside Diameter | 53.7" | |
| --- | --- | --- | --- |
| | Inside Diameter | 43.38" | |
| Cup Rotor, | Mean Diameter | 42.0" | |
| | Thickness | 1.0" | |
| | Material | 6061 | Aluminum |
| Inner Stator, | Outside Diameter | 40.624" | |
| | Inside Diameter | 30.324" | |
| Active Core Length | | 24.1" | |
| Maximum RPM | | 1903 | |
| Maximum Power | | 59.0 | MW |
| RPM @ Maximum Power | | 1868 | |
| Maximum Phase Voltage | | 1630 | $V_{rms}$ |
| Maximum Phase Current | | 8000 | $A_{rms}$ |
| Maximum Inverter Frequency | | 127 | Hertz |
| Number of Stator Poles | | 3 | |
| Number of Electrical Poles | | 8 | |
| Slots/Pole/Phase | | 5 | |

FIGS. 1 and 2 also detail the major components of a power conditioning system that is used to operate the induction machine as both a generator and a motor. The power conditioning system baseline components include a rectifier and a bi-directional inverter 35 that controls the flow of energy into and out of the induction machine 30. During active arresting, the inverter 35 creates terminal conditions at the induction machine 30 that cause energy to flow from the aircraft through the generator 30 and inverter 35 to the DC link capacitor shown in FIGS. 1 and 2. During motoring periods, to accelerate the rotor/cable spool to reduce the initial tension transient or to retract the purchase cables 10 after arrest, the inverter 35 causes energy to flow from the DC link capacitor to the induction machine 30.

One preferable power conditioning approach is a Pulse Width Modulated (PWM) inverter employing IGBT (Insulated Gate Bipolar Transistor) switching devices. The basic building block of the inverter, the pole, has two IGBT switching devices connected in series across the DC terminals of the inverter. An exemplary DC link voltage of 4,000 V is selected to allow the use of a single IGBT device in series for each switching element. This may reduce the complexity and risk associated with ensuring voltage sharing between series connected devices. High power levels are achieved by paralleling inverter poles. With the proposed single generator/inverter concept, the maximum inverter rating is approximately 75 MVA. It individual generators/inverters are required for each purchase cable and spool (see e.g., FIGS. 2, 4 and 5), the inverter rating will be approximately 38 MVA.

The rectifier converts AC power from the ship surface electrical system to DC power to charge the DC link capacitor. The rectifier is needed only during motoring operations such as retraction and initial spool acceleration, if required, to limit cable stresses.

Figure 6:
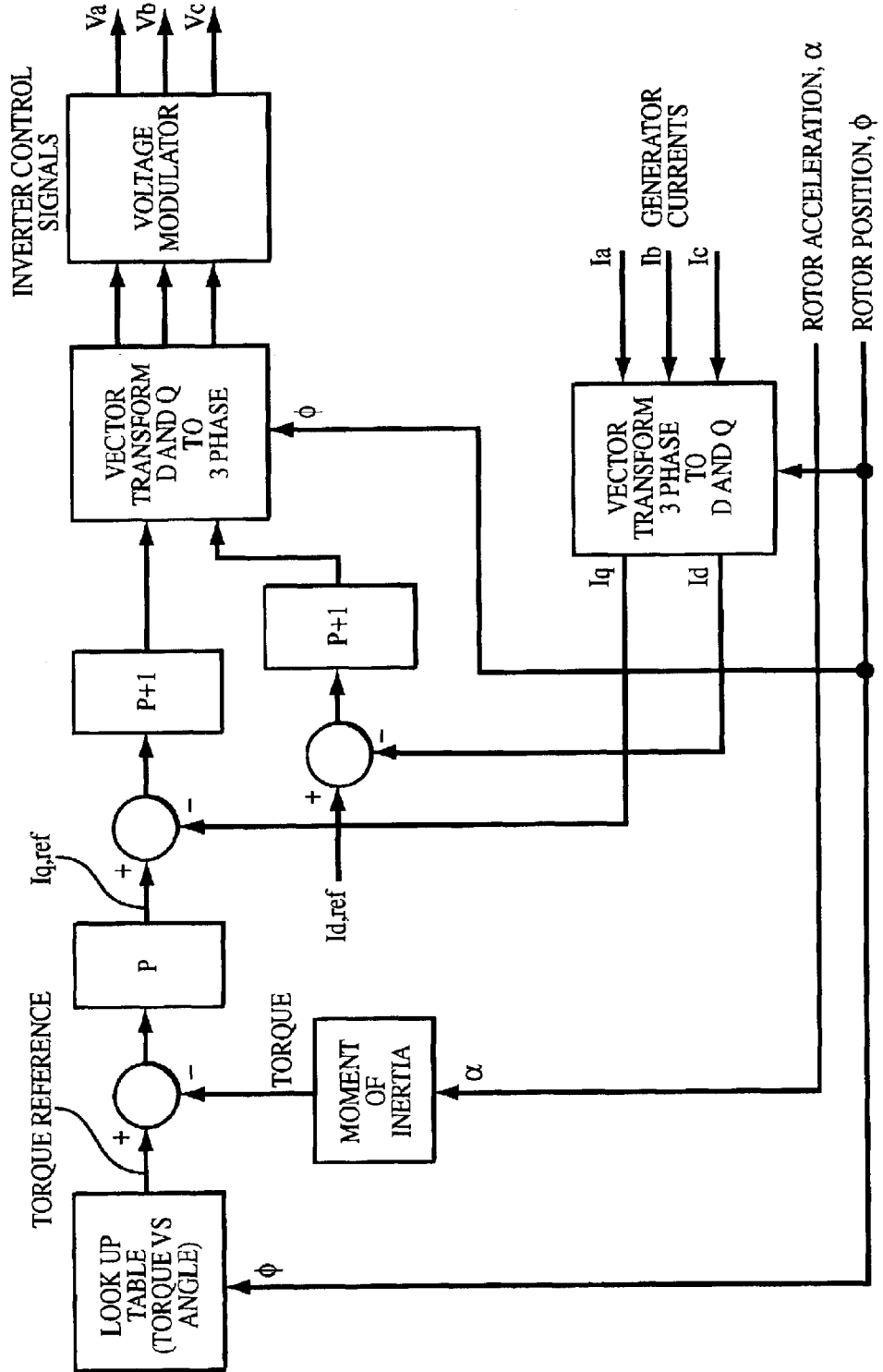
FIG. 6 shows an exemplary advanced arrestor field oriented control system block diagram.

An exemplary inverter control system utilizes an indirect field-oriented vector control system. The present arrestor control system, as illustrated in FIG. 6, is structured as a position feedback control that provides a torque reference signal to the inner generator current control loops.

The rotor shaft position (and hence the arresting cable position) is determined using a rotary shaft encoder ("angle encoder") mounted on the generator/cable spool. This shaft position data is sensed to a high degree of accuracy. The position data is used to determine, via a look up table, the appropriate torque reference for the control system. The torque data in the table is preferably developed from mechanical simulations of the arrestor system and is designed to keep the cable tension at or below a maximum allowed value (e.g., 105,000 lbs.).

The torque-angle profile is necessarily different for each type of aircraft. It may be possible to specify a velocity profile for a velocity-regulating loop, however, it may be safer to employ a torque reference that replicates the prior art hydraulic system. The actual torque that accelerates (or decelerates) the moving parts of the arrestor machine is fed back as part of the outer torque control loop. Measuring the angular acceleration and multiplying it by the moving part moment of inertia accomplishes this calculation. The actual torque is subtracted from the reference torque to form a torque error signal. A proportional controller processes the torque error signal and produces an equivalent Q-axis generator current reference.

The generator current is preferably controlled by a rotating frame current loop. The three phase generator currents $i_a$, $i_b$, $i_c$ (lower right of FIG. 6) are first vector transformed to two phases in a rotating frame that is in synchronism and phase with the D-axis of the machine rotor field. This transformation may be calculated using a transform matrix, table look-up or other common technique. The transformed stator currents appear as constant DC quantities when the machine is in steady-state operation. There are two currents in this frame, $I_q$ and $I_d$, the torque producing and flux producing currents, respectively, that form-the vector that embodies the instantaneous stator current.

A flux reference quantity $I_{d,ref}$ is set to a constant value representing the level of flux desired for the induction machine. A torque reference current quantity $I_{q,ref}$, is generated by multiplying an error torque (the difference between the desired torque from a look-up table and the actual torque based on observed rotor acceleration) by a proportional gain. The actual values of the stator current components, $I_d$ and $I_q$ are compared to their reference values, $I_{q,ref}$ and $I_{d,ref}$, to form current error signals that are processed through proportional and integral gain elements (P+I in the block diagram). The transform process is then reversed, i.e. the stator current signals are inverse transformed and then converted from two phases to three phases, to produce three inverter control signals $v_a$, $v_b$, $v_c$ that represent the three phase voltages of the inverter. The signals are converted to duty cycle signals that drive the power switches in the inverter and are applied to the induction machine.

During the cable retraction cycle, a different look-up table may be used to bring the cable back to its original position. The motor torque specified in the table is very low in accordance with the reduced forces required during this operation.

As seen in FIGS. 1 and 2, a dynamic braking resistor 40 converts the energy absorbed by the arresting engine 30 into thermal energy and dissipates it directly into a seawater coolant. The major components of the braking resistor system are preferably heating elements (resistors), a water storage tank, two water pumps (1 redundant), and tank inlet and outlet piping. The resistor heating elements may be sized to absorb 90 MJ of electrical energy over a 2.7 second interval. The thermal energy is then transferred into the cooling water in approximately 47 seconds. For design purposes, all of the energy transferred to the braking resistor 40 in 2.7 seconds may be assumed to be stored in the resistor. In the remaining 47.3 seconds of the approximately 50 second average arresting cycle, the energy is dissipated into the seawater. A constant flow of water during the arrestor operation removed the hot coolant from the tank and replaces it with cold seawater.

Direct open-loop cooling of the dynamic braking resistor 40 may be selected as the baseline design component because direct cooling is an efficient form of heat transfer. This selection helps to speed up the heat transfer process and eliminates thermal lag. A closed-loop system using clean water in a heat exchanger may also be used, however clean water is at a premium on ship-based systems. Commercially available, flanged immersion heaters may be selected for the base line resistor. These resistors are preferably installed by bolting them to a matched flange welded on the cooling water tank wall. Flanged immersion heaters are one of the most widely used methods of heating liquids, and pose no particular technical challenges. Using heating elements made of stainless steel, instead of titanium or other materials, may result in a reduction of several hundred pounds of element material. The heater element sheath material, flanges, and the cooling tank may be made of a material so as to reduce corrosion associated with the seawater coolant (e.g., INCOLOY). The approximate weight of the heater elements alone may be between 3,600 and 4,000 lbs. The heating elements are preferably sized to reach a maximum temperature of 310° F. to reduce heater volume, and to avoid extensive boiling of the seawater in the tank.

The resistor cooling water tank supports the heating elements and assures that sufficient water is available to completely cover the heating elements during the braking cycle. Eight inch inlet water feed provides roughly 150 GPM of seawater (approximately 1.2 ft/sec.) to the tank to cool the heater elements within the 47.3 seconds available. The tank may be sized to house approximately 550 ft$^2$ of heating element surface, and to allow for sufficient water volume to fully immerse the resistor elements. A ten inch drain line will be provided in the tank, above the heating elements, to discharge the hot seawater.

Nothing in the above description is meant to limit the present invention to any specific materials, geometry, or orientation of elements. Many part/orientation substitutions are contemplated within the scope of the present invention and will be apparent to those skilled in the art. The embodiments and dimensions described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. An aircraft arrestor system, comprising:
    a cross-dock pendent cable;
    first and second purchase cable spools;
    first and second purchase cables, said first purchase cable connected between a first side of said cross deck pendent cable and said first purchase cable spool and said second purchase cable connected between a second side of said cross deck pendent cable and said second purchase cable spool;
    at least one low inertia induction machine operably connected to at least one of said purchase cable spools; and
    a power circuit adapted to adjust the generator torque of said low inertia induction machine according to sensed conditions and a predefined torque profile.

2. The aircraft arrestor system of claim 1, wherein said at least one low inertia induction machine is two low inertia induction machines, a first of the two low inertia induction machines operably connected to said first purchase cable spool and a second of the two low inertia induction machines operably connected to said second purchase cable spool.

3. The aircraft arrestor system of claim 2, wherein said power circuit is adapted to adjust the generator torque of each of said two low inertia induction machines independently of each other.

4. The aircraft arrestor system of claim 3, wherein said power circuit provides closed-loop control of the torque profiles of each of the induction machines.

5. The aircraft arrestor system of claim 2, wherein each of said two low inertia induction machines is a cup-type aluminum rotor induction machine.

6. The aircraft arrestor system of claim 5, wherein said cup-type induction machines are passively accelerated.

7. The aircraft arrestor system of claim 5, wherein said cup-type induction machines are adapted to be actively accelerated as a motor when a tension on one of said purchase cables exceeds a maximum allowable purchase cable tension.

8. The aircraft arrestor system of claim 2, wherein said sensed conditions includes the angular position of a shaft of each of the induction machines.

9. The aircraft arrestor system of claim 1, wherein said at least one low inertia induction machine is a cup-type aluminum rotor induction machine.

10. The aircraft arrestor system of claim 1, wherein said arrestor system is adapted to interact with a conventional sheave-damper mechanical system.

11. The aircraft arrestor system of claim 1, wherein said predefined torque profile is stored in a library of a plurality of predefined torque profiles that are matched to different aircraft with different landing profiles.

12. A method for arresting an aircraft on a shortened runway, comprising the steps of:

providing a cross-deck pendent cable, first and second purchase cables connected to either end of said cross-deck pendent, and first and second cable spools connected to the opposite ends of said first and second purchase cables;

providing at least one low inertia induction machine connected to said first and second cable spools;

in response to a run-out of said first and second purchase cables from said first and second cable spools, applying an electrical signal to said at least one induction machine to selectively adjust the torque of the at least one induction machine to slow the run-out of said first and second purchase cables from said first and second purchase cable spools without exceeding a maximum allowed tension for each purchase cable.

13. The method for arresting an aircraft of claim 12, wherein said electrical signal is applied to said at least one induction machine according to a predefined torque profile determined based on a profile of the landing aircraft.

14. The method for arresting an aircraft of claim 13, further comprising the step of:

applying an accelerating torque to said at least one induction machine at the beginning of said run-out step to assist initial purchase cable run-out.

15. The method for arresting an aircraft of claim 12, wherein power generated by the at least one induction machine during purchase cable run-out is sunk in a dynamic braking resistor.

16. The method for arresting an aircraft of claim 12, further comprising a second low inertia induction machine, wherein each of said induction machines is connected to one of said first and second purchase cable spools.

17. The method for arresting an aircraft of claim 12, wherein the application of said electrical signal to said at least one induction machines is performed independently from the other induction machine with closed-loop feedback.

18. A system for arresting aircraft landing on the deck of a naval vessel, comprising:

a cross deck pendent cable having first and second ends, wherein said cross deck pendent cable is disposed perpendicular to a landing path on the deck of the vessel;

first and second purchase cable spools affixed to the vessel;

a first purchase cable wound around the first purchase cable spool with a free end affixed to said first end of the cross deck pendent cable;

a second purchase cable wound around the second purchase cable spool with a free end affixed to said second end of the cross deck pendent cable;

a first cup-type low inertia induction machine operably connected to said first purchase cable spool;

a second cup-type low inertia induction machine operably connected to said second purchase cable spool;

an electronic circuit operably connected to said first and second induction machines adapted to provide electrical signals to said first and second induction machines in response to a run-out of said first and second purchase cables from said first and second purchase cable spools, wherein said electrical signals are based on a predefined torque profile of said landing aircraft and said electrical signals are independently adjusted for said first and second induction machines responsive to an off-center arrest by said aircraft.

19. The system of claim 18, wherein said electronic circuit is adapted to sense the angular position of shafts of said induction machines, compare said sensed position to said predefined torque profile and apply an adjusted torque to said induction machines responsive to said comparison.

* * * * *